United States Patent
Thorpe et al.

[11] Patent Number: 6,048,477
[45] Date of Patent: Apr. 11, 2000

[54] MANUFACTURE OF COMPOSITE LAMINATES

[75] Inventors: Michael Thorpe; Andrew Hutchinson, both of Bristol, United Kingdom

[73] Assignee: British Aerospace Public Limited Company, Farnborough, United Kingdom

[21] Appl. No.: 08/985,721

[22] Filed: Dec. 5, 1997

[30] Foreign Application Priority Data

Dec. 6, 1996 [GB] United Kingdom ............. 9625368

[51] Int. Cl.[7] ................... B29C 44/06; B29C 44/12
[52] U.S. Cl. ............... 264/46.5; 264/46.6; 264/220; 264/258
[58] Field of Search ............... 264/46.5, 46.6, 264/258, 220

[56] References Cited

U.S. PATENT DOCUMENTS

| | | | |
|---|---|---|---|
| 2,728,702 | 12/1955 | Simon et al. ................ | 264/46.5 |
| 2,976,577 | 3/1961 | Gould ........................ | 264/46.6 |
| 3,286,004 | 11/1966 | Hill et al. .................. | 264/46.6 |
| 3,396,923 | 8/1968 | Windecker .................. | 264/46.6 |
| 3,873,654 | 3/1975 | Smith ........................ | 264/321 |
| 3,879,245 | 4/1975 | Fetherston et al. ........ | 264/321 |
| 4,022,644 | 5/1977 | Smith, Jr. .................. | 264/46.5 |
| 4,124,670 | 11/1978 | Cecka et al. ............... | 264/46.6 |
| 4,209,862 | 7/1980 | Cortes-Garza . | |
| 4,268,571 | 5/1981 | McCarthy ................... | 264/46.6 |
| 4,379,103 | 4/1983 | Doerfling .................. | 264/46.5 |
| 5,369,869 | 12/1994 | Bies et al. ................. | 264/46.5 |

FOREIGN PATENT DOCUMENTS

| | | | |
|---|---|---|---|
| 1 059 487 | 7/1979 | Canada . | |
| 48-30137 | 9/1973 | Japan .................... | 264/46.5 |
| 56-4437 | 1/1981 | Japan .................... | 264/46.5 |
| 0 882458 | 11/1961 | United Kingdom . | |
| 1 063 263 | 3/1967 | United Kingdom . | |
| 1421602 | 1/1976 | United Kingdom . | |
| 2232629 | 12/1990 | United Kingdom . | |

*Primary Examiner*—Allan R. Kuhns
*Attorney, Agent, or Firm*—Nixon & Vanderhye P.C.

[57] ABSTRACT

A method of forming an aircraft landing gear strut fairing/debris protector and such a fairing/debris protector are provided. The fairing/debris protector comprises first and second fiber reinforced plastics skin elements (21, 23) with a foamed core (27) between them. The method includes the steps of providing a tool having a tool surface (15, 20) to form each said skin element, forming a lay-up (21, 23) on each said tool surface of fibrous reinforcing material and plastics matrix material and allowing the matrix material at least partly to harden, positioning the tools (8, 13) such that the two skins (21, 23) are supported in their final relationship to each other and introducing a foaming resin (27) between the skins to form a foam core.

2 Claims, 3 Drawing Sheets

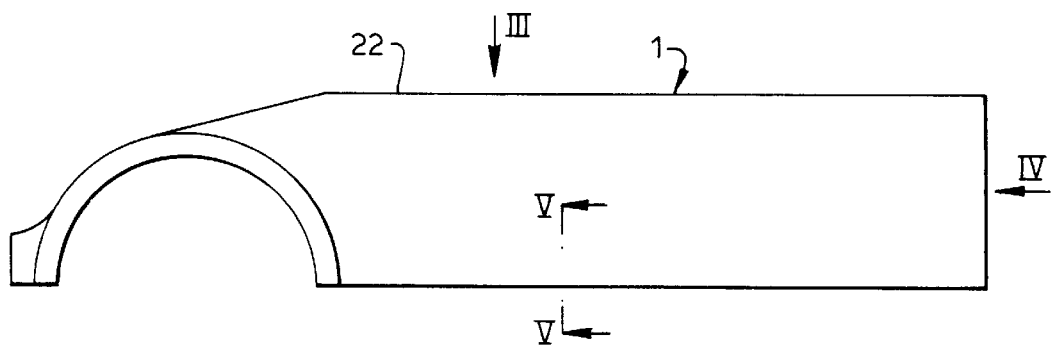
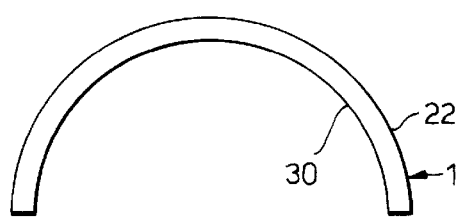
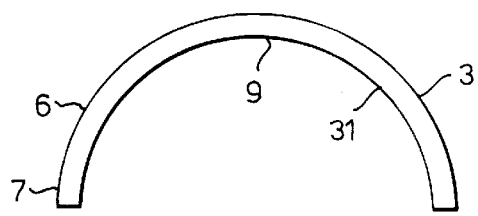
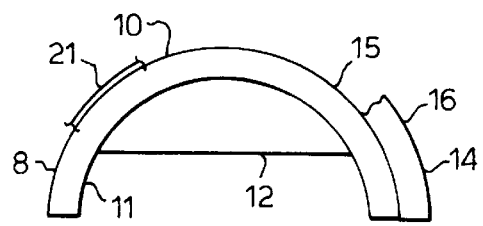
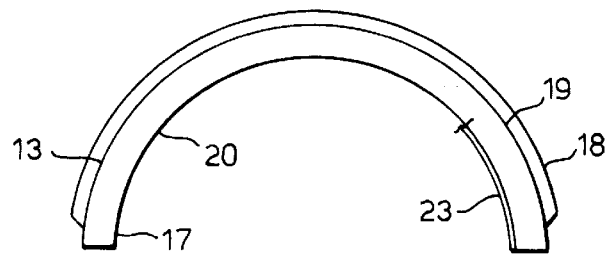

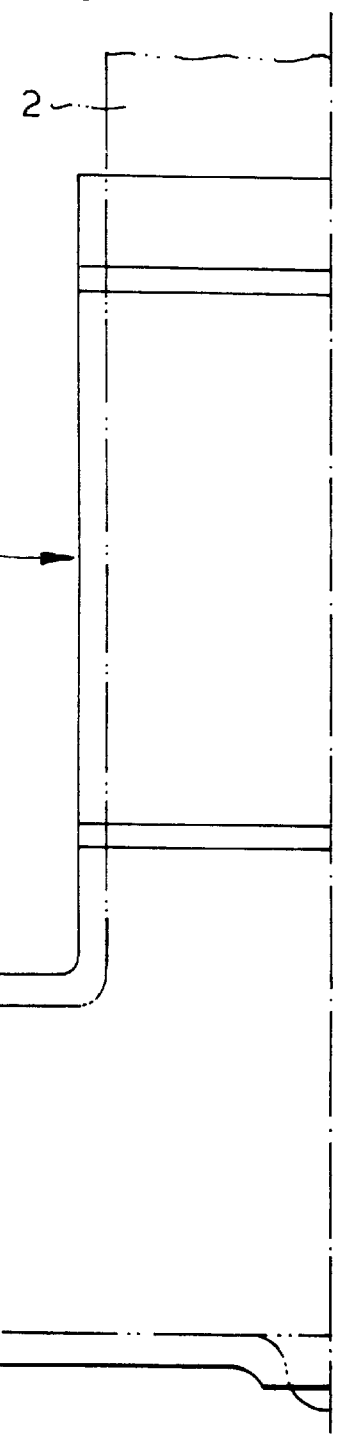
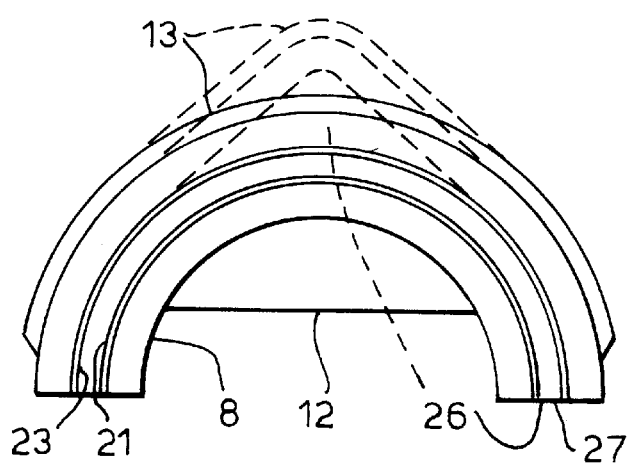
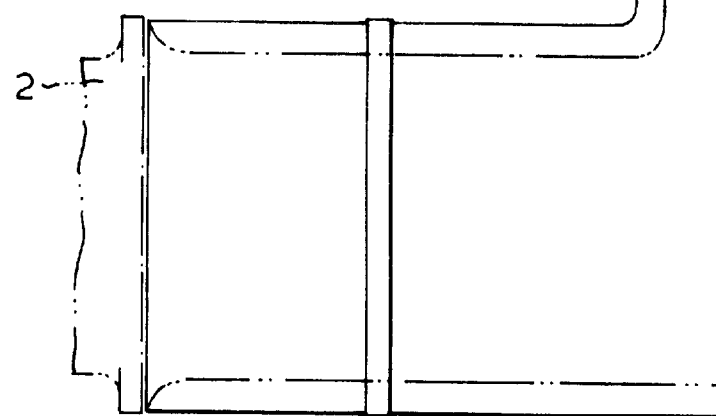

MANUFACTURE OF COMPOSITE LAMINATES

BACKGROUND TO THE INVENTION

This invention relates to the manufacture of composite laminates, in particular to an aircraft landing gear strut fairing/debris protector.

Aircraft main landing gear oleo struts can be a source of aircraft noise which can be particularly troublesome when aircraft are taking off and approaching the airfield for landing, when the gear is locked in the down position.

The aircraft main landing gear oleo struts can also be subject to debris attack, particularly during take off and landing. Debris can be in the form of stones, broken concrete and the like and may in some cases be raised from the ground by the nose landing gear, then to be struck by the main landing gear.

OBJECT OF THE INVENTION

It is an object of the invention to provide a fairing or debris protector for aircraft landing gear to be attached to the main oleo strut thereof which will reduce wind noise and avoid impact damage of debris to the gear at the same time as being light in weight and adapted to fit the shape of the gear, for secure, reliable and accurate fitting.

SUMMARY OF THE INVENTION

According to one aspect of the present invention there is provided a method of forming a composite laminate aircraft landing gear strut fairing/debris protector comprising first and second fibre reinforced plastics skin elements with a foamed core interposed therebetween, the method including the steps of providing a tool having a tool surface to form each skin element, forming a lay-up on each said tool surface of fibrous reinforcing material and plastics matrix material and allowing the matrix material at least partly to harden, positioning the tools such that the two skins are supported in their final relationship to one another and introducing a foaming resin between the skins to form a connecting foam core therebetween.

According to a second aspect of the invention there is provided an aircraft landing gear strut fairing/debris protector manufactured according to the method of the first aspect of the invention.

Fibreglass has been found surprisingly effective for use as the fibrous reinforcing material for this application.

BRIEF DESCRIPTION OF THE DRAWINGS

The invention will now be described by way of example with reference to the accompanying drawings of which:

FIG. 2 is a side view of the fairing or debris protector of FIG. 1 taken in the direction II of FIG. 1, FIG. 3 is a view of the fairing or debris protector of FIG. 2 taken in the direction III thereof, with the fairing or protector being truncated at the centre line, FIG. 4 is a view of the fairing or debris protector of FIG. 2 taken in the direction IV of FIG. 2, FIG. 5 is a section along the line V—V of FIG. 2, FIG. 6 is an end view of a splash taken from the landing gear of FIG. 3, FIG. 7 is an end view of an inner tool taken from the splash of FIG. 6, FIG. 8 is an end view of an outer tool taken from the inner tool of FIG. 7, and FIG. 9 is an end view of the tools of FIG. 7 and FIG. 8 used in combination, also showing an alternative version of the tool of FIG. 8 for forming an aerodynamic fairing.

DESCRIPTION OF THE PREFERRED EMBODIMENT

Figure 1:
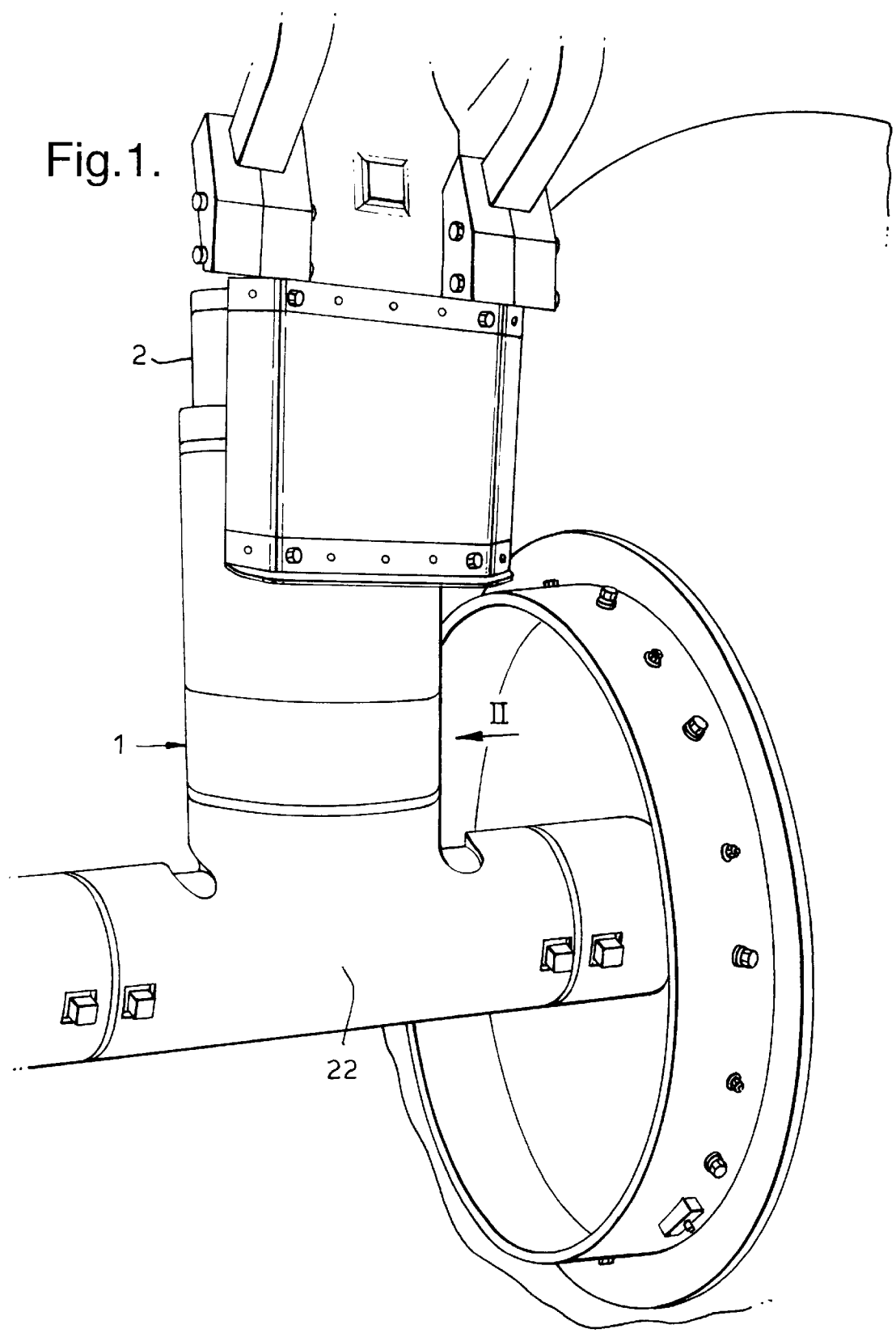
FIG. 1 is a front isometric view of a fairing or debris protector according to the invention installed on a main oleo strut of an aircraft landing gear.

Referring to FIGS. 1 and 3, a fairing/debris protector 1 according to the invention for attachment to a main oleo strut 2 of an aircraft landing gear is manufactured as follows. A mould impression or "splash" 3, see FIG. 6, is first taken from the strut 2. This is achieved by marking desired boundaries for the fairing/debris protector on the strut 2 by attaching foam material (not shown) with adhesive tape to the strut, having first degreased the strut, and applying release agent to the strut over the area from which the mould impression is to be taken. Two coats of polyester or epoxy resin (polyester preferred) gelcoat are next painted onto the surface. Referring to FIG. 6, a layup of fibreglass mat 6 approximately 10 mm thick is then applied to the surface and impregnated with polyester resin 7. The resin is then allowed to cure for between four and eighteen hours at a minimum temperature of approximately 21° C. As an alternative to wet lay-up prepreg material may be used. However, the application of heat and some consolidation pressure may be necessary with this method in order to obtain the desired surface finish and structural integrity of the splash.

By the use of gelcoat a smooth surface finish for the splash is achieved from which a tool of substantially identical shape and surface finish to the strut can be achieved.

Next, in order to manufacture a said tool 8 from the splash 3, release agent is applied to the surface 31 of the splash which was formed from the surface of the strut 2, followed by two coats of gelcoat 9. This step is followed by the application to the surface 31 of a fibreglass lay-up 10, see FIG. 7, of approximately 12 mm thickness impregnated with polyester resin 11. Optionally some reinforcement 12 to the tool 8 is applied to the rear before cure and cured in position on the tool for strengthening purposes.

Referring to FIGS. 7 and 8, manufacture of the second tool 13 proceeds as follows. A single sheet of thickness wax, sometimes called lay-up wax 14 is adhered to the tool surface 15 of tool 8. Release agent is optionally applied beforehand. In this case the wax is 12 mm thick which corresponds to the total thickness of the fairing/debris protector which will be produced in the combined tool. Two coats of gelcoat 16 are next applied either directly or over a release agent to the exposed surface of the thickness wax. When the gelcoat is substantially dry a lay-up 17 for the second tool 13 is placed on the gelcoated surface and impregnated with polyester resin. Further reinforcement 18 is applied to the rear surface 19 of the lay-up and the lay-up is allowed to cure.

Once curing is complete the tools 8 and 13 may be separated from the wax.

In order to manufacture the fairing/debris protector, firstly release agents and then lay-ups are applied to the tool surfaces 15 of tool 8 and 20 of tool 13 as follows. For tool 8, which will form a skin of the fairing/debris protector 1 which will be in intimate contact with the main oleo strut 2 in use, a lay-up 21 of two plies of 280 gram fibreglass cloth impregnated with polyester resin is formed on the tool surface 15. To form the skin which will define an exposed surface 22 of the fairing/debris protector three plies of 280 gram cloth are laid up on the tool surface 20 and impregnated with polyester resin, following application of two gelcoats to the tool surface 20. A resulting lay-up 23 is now allowed to cure.

When both lay-ups 21, 23 have cured they may be brought together in a position separated at a peripheral region by approximately 8 mm as shown in FIG. 9. The requisite separation of the lay-ups is achieved by spacing means (not shown) extending between the tools 8 and 13. Appropriate stopoff means (not shown) are next applied to the peripheral region between the two tools 8, 13 and liquid foaming resin 27 is poured into a cavity 26 formed between the two tools 8, 13. The tools are then laid down flat and the polyester expanding foam resin 27 is allowed to foam out to fill the cavity. It will be appreciated that any irregularity in the shape of the cavity 26, for example due to the aerodynamic outer shape of the fairing as shown in FIG. 9 will be accommodated by the foaming of the resin 27. Once the chemical reaction which causes the foaming is complete, after approximately one hour, foam is trimmed from the edges of the resulting fairing/debris protector 1 formed in the tools such that a groove 28 of 6 mm depth is formed, see FIG. 5, around the periphery of the fairing/protector 1. RTV silicone sealant is then applied into the groove to seal the periphery of the fairing/protector from any contaminants which the fairing/protector may encounter in use.

The surface finish of both surfaces 22, 30 of the fairing/debris protector is extremely smooth when manufactured according to the method of the invention, thus aiding its aerodynamic properties, and the resulting fairing/debris protector possesses sufficient strength in the outer skin 23 to deflect small stones and other objects, whilst the combined structure of the fairing/debris protector provides adequate crushability to avoid damage to the strut 2 when the fairing/protector 1 is struck by larger debris. In these circumstances the outer skin 23 will progressively collapse and absorb, in combination with the foamed core, sufficient energy from the impact to avoid damage to the strut 2.

In addition, the fairing/debris protector 1 is extremely lightweight having regard to its aerodynamic and protective qualities and is therefore particularly suitable for use on aircraft.

The snug fit of the inner surface 30 of the fairing/protector against the surface of the strut 2 ensures performance of the fairing/debris protector according to specification when installed and reduces the possibility of unwanted vibration of the fairing/protector 1 against the strut 2.

The fairing/protector 1 may be attached to the strut in any convenient manner, for example by clips or by fasteners passing through the fairing/protector itself and it will be appreciated that where use as an aerodynamic fairing is contemplated a fairing manufactured according to the invention, as shown dotted in FIG. 9 for example, may be fitted to the rear of the oleo strut to complement that at the front.

The qualities of fibreglass in the skins 21, 23 have been found to be particularly suitable for the minimisation of impact damage, surprisingly, whereas the use of carbon fibre as reinforcement for the skins was found to be considerably less satisfactory.

We claim:

1. A method of forming an aircraft landing gear strut fairing/debris protector, said landing gear strut having a surface to be protected, said protector comprising first and second fiber reinforced plastics skin elements with a foamed core interposed therebetween, the method including the steps of:

providing a tool having two tool surfaces, each surface comprising a mold for forming a desired skin for said protector, one of said tool surfaces having a surface configuration substantially identical to said surface of said landing gear strut;

forming a lay-up on each said tool surface, each lay-up comprising a fibrous reinforcing material and a plastics matrix material and allowing the matrix material at least partly to harden forming said skin elements;

positioning the tools such that the two skin elements are supported in their desired final relationship to one another; and introducing a foaming resin between the skin elements to form a connecting foam core therebetween.

2. A method of forming an aircraft landing gear strut fairing/debris protector comprising first and second fiber reinforced plastics skin elements with a foamed core interposed therebetween, the method including the steps of:

making a mold impression of a portion of said strut to be protected, said mold impression having a surface formed from contact with at least a strut similar to said strut, coating said surface with a mold release agent, forming a first tool lay-up on said surface, said first tool lay-up comprised of fibrous reinforcing material and plastics matrix material and allowing the matrix material to harden, removing said lay-up from said mold impression and thereby forming a first portion of a mold tool, said first portion having a tool surface identical to said portion of said strut to be protected, coating said first portion of a mold tool with a mold release agent, adhering a layer of thickness material to said tool surface, said thickness material having a thickness equal to the desired thickness of the strut fairing/debris protector, and having an external surface identical to the desired external surface of the protector;

coating said thickness material with a mold release agent, forming a second tool lay-up on said thickness material, said second tool lay-up comprised of fibrous reinforcing material and plastics matrix material and allowing the matrix material to harden, removing said second tool lay-up from said thickness material and thereby forming a second portion of a mold tool, said second portion having a tool surface identical to said desired exterior surface;

forming a lay-up of fibrous reinforcing material and plastics matrix material on each said tool surface of said first and second portions and allowing the matrix material at least partly to harden, positioning the first and second portions such that the two surfaces are supported in their desired final relationship to one another; and introducing a foaming resin between the first and second portions to form a connecting foam core therebetween.

* * * * *